United States Patent [19]

Hubbard et al.

[11] Patent Number: 4,635,628

[45] Date of Patent: Jan. 13, 1987

[54] SURGICAL FACE MASK WITH IMPROVED MOISTURE BARRIER

[75] Inventors: Vance M. Hubbard; Welton K. Brunson, both of Bedford, Tex.

[73] Assignee: Tecnol, Inc., Fort Worth, Tex.

[21] Appl. No.: 775,026

[22] Filed: Sep. 11, 1985

[51] Int. Cl.⁴ ............................................. A62B 7/00
[52] U.S. Cl. ........................... 128/201.17; 128/206.19; 128/139
[58] Field of Search ....................... 128/201.17, 206.19, 128/139

[56] References Cited

U.S. PATENT DOCUMENTS

| | | |
|---|---|---|
| 2,891,541 | 6/1959 | Tietze . |
| 3,049,121 | 8/1962 | Brumfield et al. . |
| 3,603,315 | 9/1971 | Becker, III ..................... 128/206.19 |
| 3,613,678 | 10/1971 | Mayhew ........................ 128/206.19 |
| 3,664,335 | 5/1972 | Boucher et al. . |
| 3,802,429 | 4/1974 | Bird . |
| 3,834,384 | 9/1974 | Raines . |
| 3,837,995 | 9/1974 | Floden . |
| 3,888,246 | 6/1975 | Lauer . |
| 3,890,966 | 6/1975 | Aspelin et al. . |
| 3,971,369 | 7/1976 | Aspelin et al. . |
| 3,974,829 | 8/1976 | Tate, Jr. . |
| 4,037,593 | 7/1977 | Tate, Jr. . |
| 4,064,876 | 12/1977 | Mulchi ........................... 128/206.19 |

Primary Examiner—Henry J. Recla
Attorney, Agent, or Firm—Jerry W. Mills; Gregory M. Howison

[57] ABSTRACT

A surgical face mask (10) having a pleated panel (12) for covering the nose and mouth of a wearer, and including head straps (16,18,24,26) for securing the face mask (10) to the wearer. A polyester Sontara material (36) is flame laminated and compressed with an open-cell polyester foam (34) to form an integral laminate moisture barrier which is secured across the top of the pleated panel (12). The barrier restricts the moisture content of vapor from permeating the face mask (10) and clouding eyeglasses, or the like. A polyester top border strip (58) is folded around the top edge of the pleated panel (12), and a malleable stay (38) is sandwiched therebetween. The entire combination, including the moisture barrier (32) is heat seal bonded proximate the top edge of the face mask (10) by heat seal bond techniques.

12 Claims, 4 Drawing Figures

SURGICAL FACE MASK WITH IMPROVED MOISTURE BARRIER

TECHNICAL FIELD OF THE INVENTION

The present invention pertains in general to medical equipment and, more particularly pertains to surgical face masks of the type which restrict the permeation of moisture-laden vapor through portions thereof.

BACKGROUND OF THE INVENTION

It is essential that the conditions within a medical operating room be maintained as germ free as possible. The cleanliness and sterile nature of an operating room environment are dictated by considerations concerning the health of the patient, as well as institutional and personal liability.

A required apparel worn by persons in a medical operating room is a face mask. While the cleanliness of the operating room equipment, as well as the occupants, can be carefully controlled, the cleanliness of the air within the operating room is less controllable. The surgical face masks, therefore, serve as a device for maintaining inhaled or exhaled germs from contaminating the operating room environment.

Great strides have been made in the medical supply field for providing comfortable and effective face masks. Materials are available for allowing the free passage of air through the face mask for breathing, and for preventing the permeation of germs therethrough. Because operating room personnel may be required to wear surgical face masks for extended periods of time, such masks must also be comfortable, and must be structured so as not to interfere with the breathing or the line of sight vision of the wearer. An ever present problem attendant with the use of surgical face masks is the warm, moist air exhaled by the wearer. The exhaled air has a tendency to fog or cloud eyeglasses, or other equipment such as microscopes. This fogging or clouding is a result of the high concentration of moisture vapor contained within the mask which, when diffused through the face mask material, condenses on the cooler eyeglass surfaces in the proximity of the mask.

This problem has not gone unaddressed in the art, and indeed many attempts have been made to provide masks which reduce such fogging and clouding effects. One approach utilized is the attachment of an impervious material on the top inside part of the mask to completely block the movement of all air through the top part of the mask. While this approach reduces the fogging tendency to a certain extent, it also reduces the area of the mask through which air can be breathed. In addition, there is a tendency, due to perspiration on the material, for the mask to cling to the wearer's face. This problem was later overcome by adhering an open-celled synthetic foam material to the impervious material to thereby eliminate the direct contact of the material with the wearer's face.

Other approaches taken by those familiar with the art are disclosed in U.S. Pat. No. 3,888,246. The barrier disclosed in this patent involves the use of a lightweight plastic film attached to the upper edge of the face mask material. Again, the disadvantage of the use of a plastic film is that when perspiring the mask tends to adhere to the wearer, much like the impervious material noted above. Moreover, when the impervious strip is placed on the outside surface of the mask, the exhaled vapor may yet condense on the plastic and cause an undesirable situation.

Disclosed in U.S. Pat. Nos. 3,474,829 and 4,037,593 is an air impervious vapor barrier used in connection with a surgical face mask. The vapor barrier comprises either an open-celled foam covered with an impervious sheet, or a closed cell foam.

Another source of contamination stems from the fibrous material of the face mask itself. Present face masks generally utilize a sewing operation in the fabrication thereof which requires a needle to pierce the fibrous material in order to form seams. This procedure results in the needle carrying the fibers through the material to the outside to potentially contaminate the environment. Also, the perforations made by the needle provide passages for contaminates to pass through. With such masks, the fibers released by the sewing operation may be breathed by the mask wearer, as the wearer is continually inhaling and exhaling through the mask. This is an undesirable condition in that it is of primary importance that all sources of contamination be minimized to any extent possible.

There is therefore a need for a noncontaminating surgical face mask which is both superior in its ability to prevent moisture vapor from escaping through the top portion of the mask, while yet allowing the free movement of air therethrough to facilitate breathing. There is also an associated need for a face mask which is comfortable to wear over an extended period of time, and in addition, which is economical and easily manufacturable.

SUMMARY OF THE INVENTION

The present invention described herein comprises a surgical face mask having a pleated face panel which generally covers the mouth and nose of the wearer, and which is constructed of a synthetic material impervious to particulate matter.

On the upper inside surface of the pleated face panel is a laminate moisture barrier which is heat bonded thereto by heat seal bonding ultrasound techniques. One layer of the moisture barrier comprises a polyester foam which is flame laminated to another inner layer of a 100% polyester nonwoven material. After being heat laminated, the layered composition passes between calendar rollers and is permanently compressed. The porosity of the layered composition is thus reduced, and the permeation of vapor therethrough is correspondingly restricted.

A malleable stay is sandwiched between the moisture barrier and the pleated face panel and is fixed therebetween by the heat sealed bonding of the moisture barrier to the pleated face panel.

A pair of straps are each heat seal bonded at middle sections thereof to the respective sides of the pleated face panel.

DETAILED DESCRIPTION OF THE INVENTION

Figure 1:
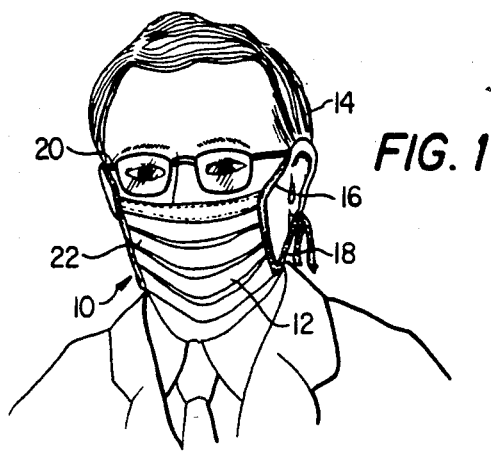
FIG. 1 is a perspective view of the face mask according to the invention, as it appears when worn over the nose and mouth of a person.

The application of the invention is best understood by first referring to FIG. 1 of the drawing. The face mask, generally designated 10, includes a pleated face panel 12 dimensioned to effectively cover the nose and mouth of the wearer 14. The face mask 10 is secured to the face of the wearer 14 by a pair of upper straps, one of which is shown as 16 tied behind the wearer's head, and a pair of lower straps, one of which is shown as 18 tied behind the wearer's neck.

The face mask 10 of the invention has special utility when worn by a person who also wears eyeglasses 20. As further noted in FIG. 1, the face mask 10 includes a number of pleats 22 which allow the face panel 12 to billow outwardly and easily conform to the general shape of the wearer's face. In addition, the pleats 22 permit the face panel 12 to expand when the wearer 14 exhales, while yet allowing the peripheral edge of the face mask 10 to remain against the wearer's face and thereby prevent the escape of germs.

Figure 2:
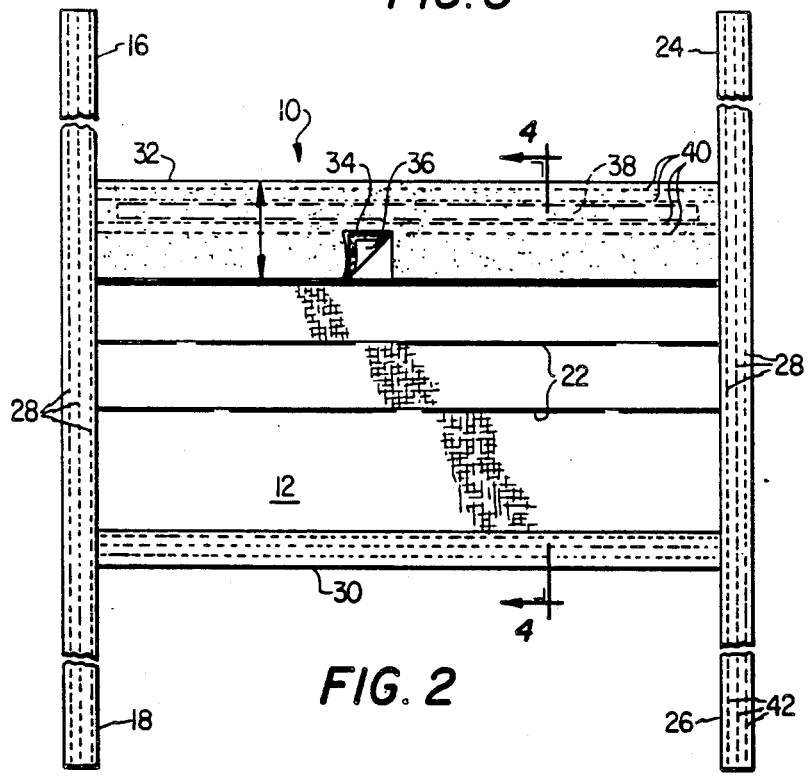
FIG. 2 is an elevational view of the face mask backside showing the moisture barrier at the top edge thereof.

In more detail, and with reference to FIG. 2, the face mask 10 is efficiently and economically constructed with synthetic materials which are well adapted for heat seal bonding to form an integral article. The heat seal bonding of the synthetic materials is highly desirable as no loose fibers are generated by such bonding technique. Indeed, any loose fibers along the edges of the face mask material are bonded and thereby made integral to the mask. Specifically, the face mask 10 includes the pleated face panel 12 with upper and lower tie straps 16 and 18 as noted above. Associated upper and lower tie straps 24 and 26 are attached to the other side of the pleated panel 12 by heat seal bonding 28. The pleated panel 12 of the face mask 10 includes a polyester bottom border strip 30 also heat seal bonded to the pleated panel 12. At the top of the pleated face panel 12 is a moisture barrier 32 heat seal bonded thereto. The moisture barrier 32 is of laminate construction comprising an open-celled polyester foam layer 34, and a synthetic resin layer 36 bonded thereto. In the preferred embodiment of the invention, the synthetic resin comprises a nonwoven polyester material. The nonwoven polyester material is obtainable from the 3M company and identified by the name Sontara. Sandwiched between the pleated face panel 12 and the moisture barrier 32 is a malleable stay 38. The sandwiched structure is heat seal bonded 40 around the stay 38 to make the top part of the face mask integral.

The pleated face panel 12 is constructed of a laminate polyester material which is impervious to the penetration or escape of particulate matter therethrough. In addition, the material of which the pleated face panel 12 is constructed allows free movement of air therethrough so as not to inhibit air inhaled or exhaled by the wearer. Specifically, the pleated face panel 12 is constructed of a synthetic, thermoplastic polymeric microfiber, disclosed in U.S. Pat. No. 3,837,995 issued to J. Floden. The noted material is highly advantageous as it is readily bondable by heat seal ultrasound techniques. The polyester bottom border strip 30 is folded around the bottom edge of the pleated face panel 12, and then heat seal bonded, as shown by the dashed lines in FIG. 2. Heat seal bonding is applied on the front and back sides of bottom border strip 30 to prevent the face mask material from delaminating, and also to add strength such that the pleated face panel 12 cannot be easily ripped or torn.

Top left head strap 16 and bottom left head strap 18 are essentially a single strip of polyester material folded upon itself, and folded around the side edge of the pleated face panel 12. The upper and lower left head straps 16 and 18 are then heat sealed along the entire length thereof, and also to the side of the pleated face panel 12 to form an integral structure. Right upper and lower head straps 24 and 26 are comparably constructed and attached.

The heat seal bonding along the entire edge of each of the four head straps creates perforations 42. This effectively roughens the straps such that when tied or knotted behind the wearer's head and neck there is a reduced tendency of the polyester straps to loosen.

Figure 3:
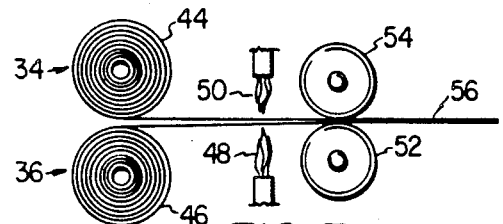
FIG. 3 is a simplified illustration of the flame laminating process for fabricating the moisture barrier.

In accordance with the invention, the laminated moisture barrier 32 is constructed according to the process depicted in FIG. 3. The open-celled polyester foam material 34 from roll 44 is brought into layered engagement with the nonwoven polyester material 36 of roll 46. The combination is heated by flames 48 and 50 to a temperature such that the materials tend to adhere together. The layered combination is then passed through calendar rollers 52 and 54 which are slightly spaced to compress the heated materials together. The heated synthetic materials are somewhat mashed together by the calendar rollers 52 and 54 to reduce, but not eliminate, the permeability thereof to the passage of air. The compressed materials are allowed to cool, thereby providing a permanently compressed laminate composite 56 well suited for use as the moisture barrier 32 described above.

Figure 4:
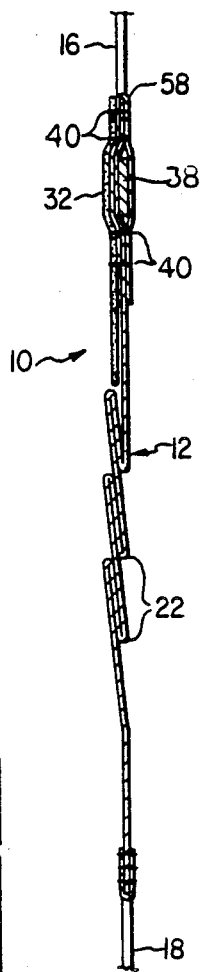
FIG. 4 is a sectional side view of the face mask taken along line 4—4 of FIG. 2.

FIG. 4 is a cross-sectional view of the face mask 10, particularly illustrating the laminate composite 56 forming moisture barrier 32. Also shown is the general construction of the folds in the face panel 12 forming the pleats 22. Stay 38 is also shown in cross-section.

Along the top edge of the face mask 10 is a polyester top border strip 58 which strengthens the top portion of the pleated face panel 12, and in addition, secures the malleable stay 38 thereto. The malleable stay 38 is constructed of an elongate narrow strip of aluminum secured on the outside surface and near the top edge of the pleated face panel 12. The malleable stay 38 conforms to the curvature of the bridge of a wearer's nose so as to provide a close fit of the face mask 10 around the nose of the wearer. When the face mask 10 is applied over the nose and mouth of the wearer, the stay 38 is simply bent, with one's fingers, around the bridge of the nose. While aluminum is easily bent to conform to the curvature of a person's face, other materials may be used with equal effectiveness.

Of particular significance, the invention includes the moisture barrier 32 fixed to the upper inside surface of the pleated face panel 12 to prevent the permeation of moisture therethrough. The formation of condensation or moisture on the wearer's eyeglasses 20 is thereby prevented. The moisture barrier 32 has been found to be most effective when it covers about twenty percent of the inside top surface of the pleated face panel 12. In the preferred embodiment, the vertical dimensions of the moisture barrier 32 is about one inch. It is noted that the polyester foam layer 44 is worn against the wearer's face.

Because of this specially constructed moisture barrier 32, the vapor exhaled through the nose or mouth of the wearer 14 is restricted from permeating through the top 20% of the face mask 10, and thus such moisture is ineffective to condense on the eyeglasses 20 and impair the person's vision. Moreover, the open-celled nature of the polyester foam, and the Sontara material allow the passage of air therethrough. Therefore, the provision of a moisture impervious strip does not substantially reduce the area of the face mask through which fresh air may be breathed.

The moisture barrier 32 is heat seal bonded on the top inside surface of the pleated face panel 12, and to the top border strip 58 around the stay 38. This is shown by bond points 40. The right and left edges of the moisture barrier 32 are secured to the pleated face panel 12 by the respective right and left upper and lower head straps being folded thereover and heat seal bonded, as described above.

It is seen from the foregoing that an inexpensive and highly advantageous surgical face mask is provided. The selection of the synthetic materials provides not only an exceptionally effective moisture barrier, but also a product which is easily constructed by pattern cutting the various shapes and bonding the various pieces together by ultrasound.

Since various modifications to the face mask described herein are undoubtedly possible by those skilled in the art without departing from the scope and spirit of the invention, the detailed description is to be considered illustrative and not restrictive of the invention as claimed hereinbelow.

What is claimed is:

1. In a surgical face mask of the type having a panel for covering the nose and mouth of a wearer, and means for securing the mask to the wearer's face, the improvement in said mask comprising a barrier strip disposed across the top inside surface of said panel for restricting the permeation of moisture therethrough, said barrier strip comprising a synthetic resin material layer sandwiched between a polyester foam material layer and said panel.

2. The surgical face mask of claim 1 wherein said synthetic resin material comprises a polyester material.

3. The surgical face mask of claim 2 wherein said foam material is open-celled.

4. The surgical mask of claim 3 wherein said polyester material and said foam material are laminated together so as to form an integral barrier strip.

5. The surgical mask of claim 4 wherein said barrier strip is permanently compressed to reduce permeation of vapor therethrough.

6. The surgical face mask of claim 1 further including a malleable stay attached to said face panel for forming said panel to a desired shape around the wearer's nose.

7. The surgical face mask of claim 6 further including a border strip of material sandwiching said stay between the border strip and the panel, and a heat-made bond around said stay fastening said border strip and said stay to said panel.

8. The surgical face mask of claim 7 wherein said border strip is polyester and is folded around the top edge of said panel.

9. The surgical mask of claim 8 wherein said barrier strip is disposed adjacent said border strip and further including a heat seal bond around said stay for fastening said border strip, said stay and said barrier strip proximate the top edge of said panel.

10. A face mask with an improved moisture barrier, comprising:
a panel constructed of a polyester material for covering a portion of a wearer's face;
means for fastening said panel to the wearer's head;
a moisture barrier constructed of a polyester material layer laminated to a polyester open-celled foam layer;
a stay;
a polyester border folded over the top edge of said panel and sandwiching said stay therebetween; and
bonding means bonding said panel, moisture barrier and border together across the top inside surface of said panel and peripherally around said stay with said polyester material layer disposed between said open-celled foam layer and said polyester border.

11. The face mask of claim 10 wherein the polyester material and the foam of said moisture barrier are integrally laminated together.

12. The face mask of claim 11 wherein said moisture barrier is permanently compressed to reduce permeation of vapor therethrough.

* * * * *